United States Patent [19]

Nute

[11] Patent Number: 5,513,326
[45] Date of Patent: Apr. 30, 1996

[54] SYSTEM FOR OPTIMIZING DATA TRANSFER

[75] Inventor: Robert A. Nute, Westboro, Mass.

[73] Assignee: Quantum Corporation, Milpitas, Calif.

[21] Appl. No.: 434,797

[22] Filed: May 4, 1995

Related U.S. Application Data

[63] Continuation of Ser. No. 365,244, Jun. 12, 1989, abandoned.

[51] Int. Cl.⁶ ..................................................... G06F 5/06
[52] U.S. Cl. .................................... 395/250; 364/DIG. 1; 364/238.6; 364/238.8; 364/239; 364/239.1; 364/239.6
[58] Field of Search ................................. 395/250, 275, 395/550

[56] References Cited

U.S. PATENT DOCUMENTS

| | | | |
|---|---|---|---|
| 4,220,997 | 9/1980 | Hager | 395/550 |
| 4,298,932 | 11/1981 | Sams | 364/200 |
| 4,344,132 | 8/1982 | Dixon et al. | 364/200 |
| 4,463,443 | 7/1984 | Frankel et al. | 395/250 |
| 4,473,879 | 9/1984 | Tachiuchi et al. | 364/200 |
| 4,607,348 | 8/1986 | Sheth | 395/275 |
| 4,613,954 | 9/1986 | Sheth | 395/250 |
| 4,638,222 | 1/1987 | Sawaki | 318/111 |
| 4,644,463 | 2/1987 | Hotchkin et al. | 395/250 |
| 4,646,280 | 2/1987 | Toyosawa | 369/50 |
| 4,829,421 | 5/1989 | Ritchie | 364/200 |
| 4,835,346 | 5/1989 | Setton et al. | 364/200 |
| 4,853,841 | 8/1989 | Richter | 364/200 |
| 4,879,558 | 11/1989 | Swanson | 341/51 |
| 4,910,670 | 3/1990 | Smith et al. | 364/200 |
| 4,931,924 | 6/1990 | Kageura | 364/200 |
| 4,956,808 | 9/1990 | Aakre et al. | 395/250 |
| 5,014,324 | 5/1991 | Mazumder | 382/7 |
| 5,038,278 | 8/1991 | Steely, Jr. et al. | 364/200 |

OTHER PUBLICATIONS

Archive Corporation, *Archive Streaming Handbook*, (1982), pp. 1–1 to 1–7, 1–20 to 1–23, 4–1 to 4–6, 5–1, 5–12 to 5–15, 7–2 to 7–7, 9–38 to 9–41, 9–44 to 9–47, 9–52 to 9–59.

*Primary Examiner*—Jack B. Harvey
*Assistant Examiner*—Ayaz R. Sheikh
*Attorney, Agent, or Firm*—Fish & Richardson

[57] ABSTRACT

Optimizing data transfer to a storage device by providing a speed control circuit which adjusts, in a continuously varying manner, a transfer rate of a storage device according to utilization of a data buffer.

31 Claims, 2 Drawing Sheets

SYSTEM FOR OPTIMIZING DATA TRANSFER

This application is a continuation of United States application Ser. No. 07/365,244, filed Jun. 12, 1989, now abandoned.

BACKGROUND OF THE INVENTION

The present invention relates to storing computer information.

It is known to store computer information on magnetic tape driven by streaming tape drives. Information is stored on the tape by using a write head to change the magnetic condition of the tape as the tape moves across the write head. This information is stored in units known as blocks, where between each block is a blank area, i.e., a gap, where no information is stored. Information is read from the tape by using a read head to sense the changes of flux produced by the local magnetic condition of the tape as the tape moves across the read head. A tape which moves linearly across the read and write heads without stopping in the gaps between blocks is a "streaming" tape.

Because information is stored serially on the tape in a uniform pattern, information must be written to and read from the tape at a rate corresponding to the speed at which the tape drive operates. Streaming efficiency and throughput depend on continuous tape motion. Therefore, if the rate of host computer transfer is below that required to maintain streaming operation of the drive, efficiency drops due to the necessity of repositioning the tape, a phenomenon particular to streaming tape drives. This condition is defined as an underrun condition. Additionally, if the rate of host computer transfer is above that required to maintain streaming operation, efficiency drops due to overflowing a data buffer. This condition is defined as an overflow condition.

This problem has been addressed by equipping tape drives with two speeds. If the processor can not transfer data at the higher drive speed and repositioning is frequent, the drive resorts to a lower speed to prevent repetitive underrun (this lower speed is usually ⅓ or less the higher rate). In this type of system, the higher speed of the drive is usually slower than what the drive is ultimately capable of in order to minimize using the lower speed. This may, however, result in frequent overrun. The higher speed is chosen to stay below the "typical" processor transfer rate; thus, favoring overrun as opposed to underrun, because underrun requires repositioning and/or speed change.

SUMMARY OF THE INVENTION

It has been discovered that by providing a speed control circuit which adjusts, in a continously variable manner, a transfer rate of a storage device according to utilization of a data buffer, data transfer to the storage device may be advantageously optimized.

DESCRIPTION OF THE PREFERRED EMBODIMENT

Drawings The drawings will first be briefly described.

Structure

Figure 1:
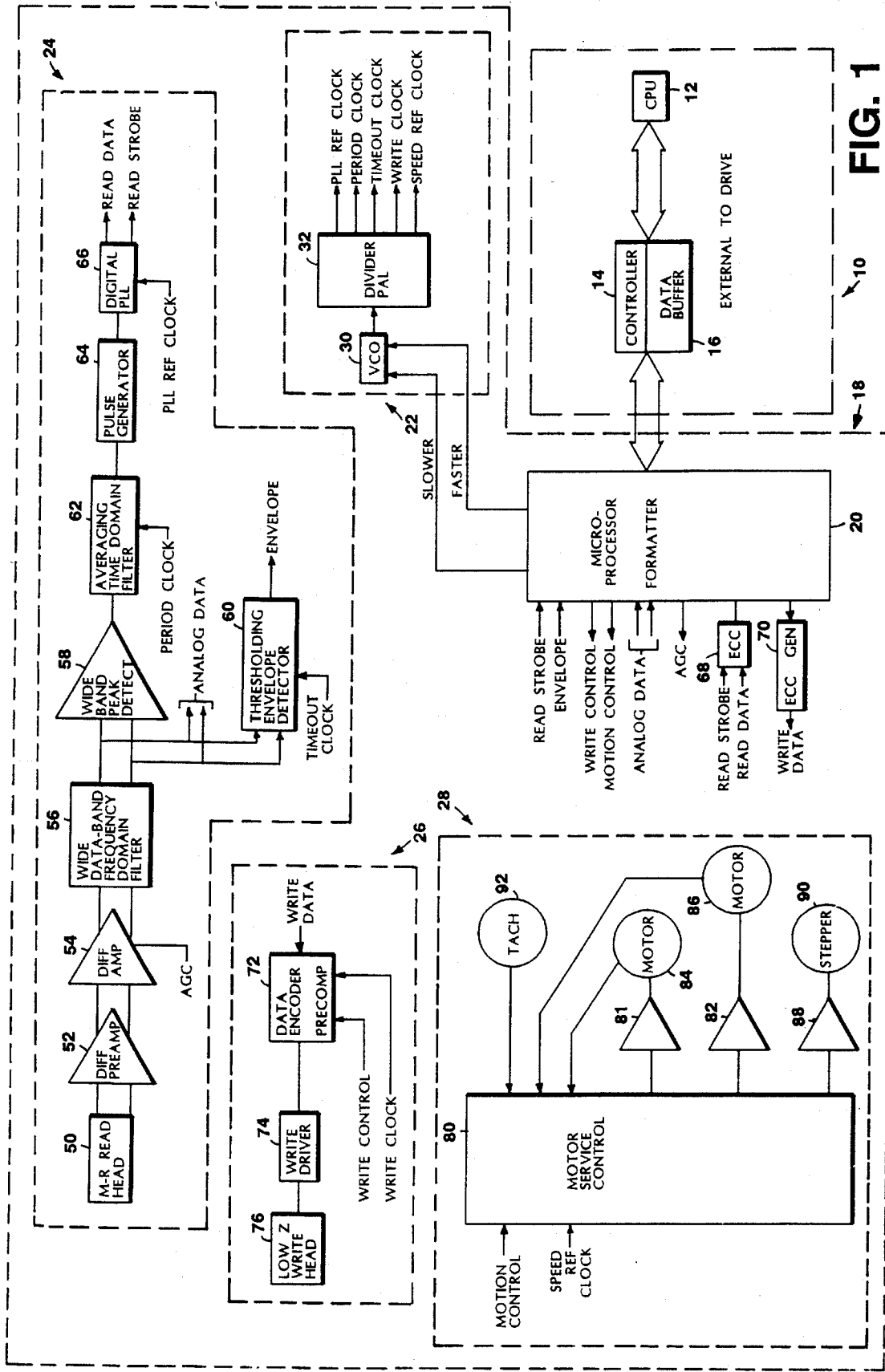
FIG. 1 is a block and schematic diagram showing a system for optimizing data transfer in accordance with the present invention.

Referring to FIG. 1, system 10 for optimizing data transfer includes: central processing unit (CPU) 12 which sends and receives user data to and from controller 14 at varying rates; controller 14, which interprets commands, contains cache data buffer 16 and communicates with streaming tape drive 18; and, streaming tape drive 18 (a serial data storage device), which includes local microprocessor/formatter 20, speed control circuitry 22, read circuit 24, write circuit 26 and motor circuit 28.

Speed control circuit 22 utilizes microprocessor/formatter 20 and data buffer 16 (which is sufficiently large to allow data transfer to be adjusted without data underrunning or overflowing buffer 16) and includes voltage controlled oscillator (VCO) 30, and divider circuit 32 (e.g., a programmable array logic (PAL) divider). Microprocessor/formatter 20 outputs two signals, a "slower" signal and a "faster" signal, to VCO 30, which outputs a clock signal to divider 32. Divider 32 outputs a plurality of clock signals (PLL REF CLOCK, PERIOD CLOCK, TIMEOUT CLOCK, WRITE CLOCK, and SPEED REF CLOCK) based upon the inputted clock signal. These clock signals adjust the speed of all drive circuits accordingly.

Read circuit 24 includes read head 50 (e.g., a magnetoresistive read head which provides a constant output amplitude for varying tape speed) outputting a low level signal to differential preamplifier (DIFF PRE AMP) 52 which is located near read head 50, receives the low level signal from read head 50 and provides an amplified signal to gain controlled differential amplifier (DIFF AMP) 54. Differential amplifier 54 provides additional gain, which is adjustable via an analog automatic gain control (AGC) signal which is generated by microprocessor/formatter 20 using an "analog data" signal, to provide a signal which is applied to wide data band frequency domain filter 56. Filter 56 outputs a signal to wide band peak detector 58 and the "analog data" signal to envelope detector 60 and microprocessor/formatter 20. Filter 56 is a low-pass filter set to break at one octave above the highest data frequency for the highest tape speed of drive 18; because read head 50 provides a constant output amplitude at any tape speed, there is no need to change the breakpoint of filter 56 in order to maintain a constant signal to noise ratio of the signal produced by filter 56. Wide bank peak detector 58 functions as a logarithmic differentiator so that it has very high gain over the peaks of the signal coming from filter 56. Accordingly, peak detector 58 provides an output corresponding to the peak of its input signal. Thresholding envelope detector 60 also receives a "time-out" clock from divider 32 and outputs an "envelope" signal which is applied to microprocessor/formatter 20. The "envelope" signal indicates the presence of usable data in read circuit 24. Wide band peak detector 58 outputs a signal to time domain filter 62 which also receives a period clock signal from divider 32. Filter 62 eliminates spurious transitions that may be provided by peak detector 58 by averaging groups of spurious transitions for a given peak. Time domain filter 62 outputs a signal to pulse generator 64 which outputs a signal having a constant pulsewidth to digital phase lock loop (PLL) 66 which also receives a PLL reference clock from divider 32. Digital PLL 66 outputs a read data signal (READ DATA) that forms the input to error detection/correction circuit (ECC) 68. The read data signal is synchronized using a synchronizing signal (READ STROBE) which is also provided by Digital PLL 66. ECC 68 checks the received signal for error indicia in its error code and corrects the signal if errors are detected. Data is then converted in microprocessor/formatter 20 to be sent to controller 14 and eventually to CPU 12.

User data coming from CPU 12 is sent via controller 14 to microprocessor/formatter 20. Microprocessor/formatter 20 sends data to error correction code generator (ECC GEN) 70 which outputs a write data signal having ECC data to write circuit 26. Write circuit 26 includes modified frequency modulation (MFM) data encoder 72 which receives the write data signal from ECC generator circuit 70 as well as a write clock from divider circuit 32 and a write control signal from microprocessor/formatter 20. Data encoder 72 includes a precompensation circuit (PRECOMP) which minimizes the effects of interference between bits and, thus, minimizes peak shift of data stored on the tape. Data encoder 72 modulates a signal which is applied to write driver 74. Write driver 74 provides a signal to write head (LOW Z WRITE HEAD) 76, which is, e.g., a low impedance write head which, because it has low impedance, can get current flowing quickly, thus, minimizing peak shift due to slow write current rise times.

Motor servo control circuit 80 of motor circuit 28 receives a motion control signal from microprocessor/formatter 20 and a speed reference clock from divider circuit 32. Motor servo control circuit 80 outputs signals through drivers 81, 82 to motors 84, 86 respectively. Motor servo control circuit 80 also outputs a signal through driver 88 to stepper 90 which steps heads 76/50 between different tracks of the tape. Tachometer 92 outputs a signal to motor servo control circuit 80 to monitor motor speed and compare it to the reference clock from divider circuit 32.

Operation

CPU 12 outputs or receives user data to and from data buffer 16 of controller 14. Microprocessor/formatter 20 monitors the status of data buffer 16. Both static (i.e., the amount of storage space available in data buffer 16) and dynamic (i.e., the speed in which the amount of storage space in data buffer 16 is changing) conditions of buffer usage are monitored. Speed control circuitry 22 controls and adjusts the speed of motors 84, 86 and the operating conditions of read circuit 24 and write circuit 26 of tape drive 18 in order to maintain the rate of data transfer within upper and lower limits of data buffer 16.

Figure 2:
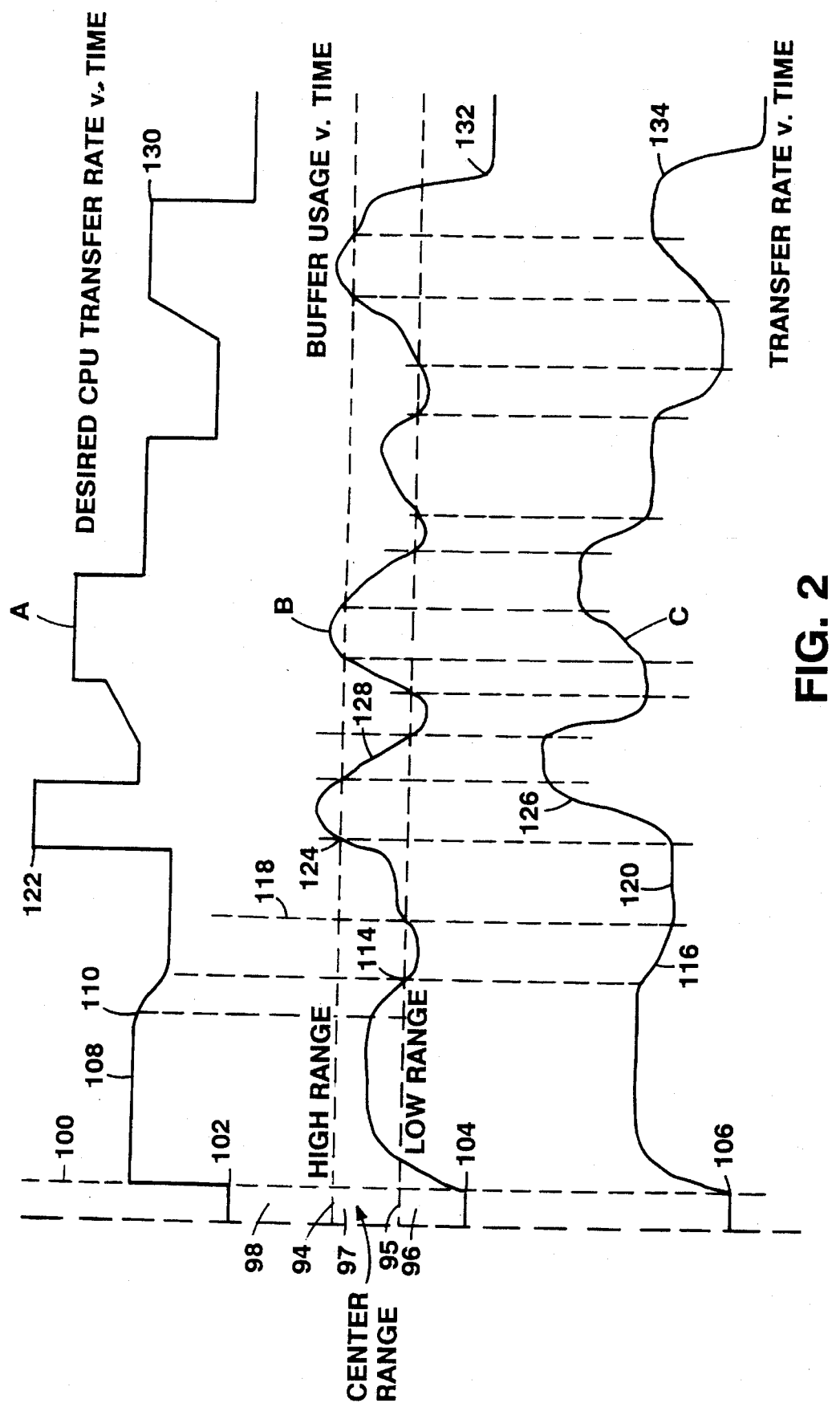
FIG. 2 is a timing diagram showing an example of data transfer utilizing the FIG. 1 system.

Referring to FIG. 2, line A shows a graph of a desired central processing unit transfer rate versus time, line B shows a graph of buffer usage versus time having upper and lower limits 94, 95 which define low range 96, center range 97 and high range 98, and line C shows a graph of tape speed (transfer rate) versus time.

In general, when data buffer 16 fills beyond a center range to a high-range, as determined by microprocessor/formatter 20, drive 18 is instructed to increase its speed (and thus transfer data faster). More specifically, when drive 18 is instructed to increase its speed by microprocessor/formatter 20, microprocessor/formatter 20 asserts the "faster" signal which is sent to VCO 30. VCO 30 in turn increases the frequency of the clock signal that VCO 30 provides to divider circuit 32 and, thus, the frequencies of the clock signals provided by divider circuit 32 are also increased. Accordingly; read circuit 24 functions at a faster rate because TIMEOUT CLOCK, PERIOD CLOCK AND PLL REF CLOCK increase the operating rate of envelope detector 60, time domain filter 62 and digital PLL 66, respectively, (these circuits are the time dependent circuits of read circuit 24); write circuit 26 functions at a faster rate because WRITE CLOCK increases the operating rate of data encoder 72 (this circuit is the time dependent circuit of write circuit 26); and, motor circuit 28 functions at a faster rate because SPEED REFERENCE CLOCK increases the operating rate of motor servo control 80, (the time dependent circuit of motor circuit 26) which in turn increases the speed of motors 84, 86.

Likewise, when buffer 16 empties below the center range to low-range 96, drive 18 is instructed to decrease its speed (and thus transfer data slower). More specifically, when drive 18 is instructed to decrease its speed by microprocessor/formatter 20, microprocessor/formatter 20 asserts the "slower" signal which is sent to VCO 30, which, in turn, decreases the frequency of the clock signal that VCO 30 provides to divider circuit 32, and thus the frequencies of the clock signals provided by divider circuit 32 to the time dependant circuits of read circuit 24, write circuit 26 and motor circuit 28.

Drive speed is maintained at a constant speed as long as the buffer level is within center range 97. When drive 18 is maintained at a constant speed, the "faster" and "slower" signals provided to VCO 30 are not changed and thus the frequency of the clock signal of VCO 30, and the clock signals of divider circuit 32, remain constant. By adjusting the speed of drive 18, the transfer rate is adjusted such that data buffer 16 is maintained within its center range. Accordingly, at any running speed the bit density on the tape is kept constant.

Accordingly, referring to the FIG. 2 example, simultaneously at time 100: CPU 12 starts to transfer data 102; buffer 16 begins to fill at 104; and tape drive 18 is commanded to start at 106. While the transfer rate remains relatively stable at 108, buffer utilization matches tape speed. At time 110, the transfer rate decreases, causing data buffer 16 to empty below the center range at time 114 thus causing tape drive 18 to slow at 116 until at time 118 buffer utilization rises into the center range. While buffer utilization is in the center range, tape speed remains steady at 120. At time 122, there is a burst of data transfer, data buffer 16 quickly fills and at time 124 rises above the center range thereby causing tape drive 18 to increase its transfer rate at 126. The speed of tape drive 18 continues to increase until buffer utilization again enters the center range at 128, at which point tape drive speed remains steady. This transfer continues until the CPU transfer is complete at 130 at which point data buffer 16 empties at 132 and tape drive 18 is commanded to stop at 134.

OTHER EMBODIMENTS

Other embodiments are within the scope of the following claims. E.g., the rate of change of the level of data stored in buffer 16, i.e., the rate of change of buffer utilization, may be used to determine how quickly, and/or how far, to adjust motor speed, thus advantageously minimizing hunting and overshooting of system 10. Also while buffer utilization remains between upper and lower marks 94, 95, minor adjustments may be made to the tape speed in order to keep the dynamic condition of data buffer 16, i.e., the change in utilization of storage in buffer 16, to zero. Additionally, the storage within buffer 16 may be skewed to allow more space for an underrun condition than for an overflow condition. In this way, avoidance of repositioning of the drive is given priority as repositioning is only necessary for the underrun condition. Also, e.g., streaming tape drive 18 may be any other type at serial data storage device, such as an optical storage device.

What is claimed is:

1. An apparatus for optimizing data transfer between a central processing unit and a serial storage device, said data being buffered in a data buffer between said central processing unit and said serial storage device, such that data is transferred between said data buffer and said serial storage device, said apparatus comprising:

monitoring circuitry for detecting utilization of said buffer, wherein utilization is based at least in part on the quantity of data in said buffer, and for providing a utilization signal based on said utilization to a processor, said utilization signal providing an indication which indicates whether said quantity of data in said buffer is within a desired range;

said processor for receiving said utilization signal and for providing a speed control signal to a speed control circuit, wherein said speed control signal causes said speed control circuit to adjust the transfer rate of said serial data storage device in a continuously varying manner in response to a signal received from said processor indicating that said utilization is not within said desired range.

2. The apparatus of claim 1 wherein said serial data storage device comprises:

a data storage means;

a variable read circuit for reading data from said data storage means at continuously varying transfer rates; and a variable write circuit for writing data to said data storage means at continuously varying transfer rates.

3. The apparatus of claim 2 wherein said serial data storage device includes a variable speed motor for controlling the speed at which said read and write circuits read and write data to and from said data storage means, said motor having speed varied in response to said speed control circuit.

4. The apparatus of claim 2 wherein said read circuit includes a read head configured to provide a constant output amplitude for varying data storage means speed.

5. The apparatus of claim 4 wherein said read head includes a magneto-resistive read head.

6. The apparatus of claim 2 wherein said read circuit includes a low-pass filter configured to break at one octave above the highest data frequency for the highest speed of said serial data storage device.

7. The apparatus of claim 6 wherein said low-pass filter is a wide data band frequency domain filter.

8. The apparatus of claim 2 wherein said read circuit includes a peak detector configured to provide an output corresponding to a peak of an input signal.

9. The apparatus of claim 8 wherein said peak detector is configured to provide a high gain output corresponding to said peak of said input signal.

10. The apparatus of claim 9 wherein said peak detector functions as a logarithmic differentiator.

11. The apparatus of claim 8 wherein said read circuit further includes a filter configured to eliminate spurious transitions from said output corresponding to said peak of said input signal.

12. The apparatus of claim 11 wherein said filter averages groups of spurious transitions for a given peak.

13. The apparatus of claim 2 wherein said read circuit includes a synchronizing circuit configured to synchronize signals read from said data storage means.

14. The apparatus of claim 13 wherein said synchronizing circuit includes a phase lock loop circuit.

15. The apparatus of claim 14 wherein said phase lock loop circuit is a digital phase lock loop.

16. The apparatus of claim 2 wherein said write circuit includes a data encoder configured to modulate data being transferred to said data storage means.

17. The apparatus of claim 16 wherein said modulated data is modified frequency modulation data.

18. The apparatus of claim 16 wherein said data encoder includes a precompensation circuit configured to minimize effects of interference between data transferred to said data storage means.

19. The apparatus of claim 2 wherein said write circuit includes a write head configured to transfer data to said data storage means.

20. The apparatus of claim 19 wherein said write head is a low impedance write head.

21. The apparatus of claim 1 wherein said utilization signal provides a low range indication, a center range indication, and a high range indication, wherein each indication corresponds to a range of quantity of data in said data buffer.

22. The apparatus of claim 21 wherein said processor provides a signal to said speed control circuitry to:

(a) maintain said transfer rate at the current rate in response to said center range indication, (b) continuously decrease said transfer rate in response to said low range indication, and (c) continuously increase said transfer rate in response to said high range indication.

23. The apparatus for optimizing data transfer of claim 21 wherein the change of utilization of said buffer is related to the change of the extent to which said buffer is filled with data, and said transfer rate is adjusted to minimize the change of utilization of said buffer.

24. The apparatus of claim 1 wherein said serial data storage device includes a tape drive.

25. The apparatus of claim 24 wherein said tape drive is a streaming tape drive.

26. An apparatus for optimizing data transfer between a central processing unit and a serial data storage device, wherein data is buffered in a data buffer between said central processing unit and said serial data storage device, said serial data storage device comprising:

a speed control circuit for providing clock signals in a continuously varying manner in response to utilization of said data buffer, wherein said utilization is based at least in part on how much data is in said buffer;

a read circuit for reading data from said serial data storage device; and a write circuit for writing data to said serial data storage device;

said read and write circuits changing speed at which data is read or written in response to said clock signals.

27. The apparatus of claim 26 wherein said speed control circuit includes a voltage controlled oscillator providing a clock output.

28. The apparatus of claim 27 wherein said speed control circuit includes a divider circuit configured to receive said clock output and to provide said plurality of clock signals.

29. The apparatus of claim 28 wherein said divider circuit is a programmable array logic divider.

30. A method of optimizing data transfer between a serial data storage unit and a central processing unit, wherein data is buffered in a data buffer between said serial data storage unit and said central processing unit, such that data is transferred between said data buffer and said serial data storage unit at a transfer rate, said method comprising the steps:

monitoring utilization of said data buffer, wherein utilization is based at least in part on how much data is in said buffer;

adjusting said transfer rate of said serial data storage device in a continuously varying manner in response to the utilization of said data buffer.

31. The method of claim 30 wherein said utilization of said data buffer is based on the extent to which said buffer is filled with data, said extent being classified into ranges includes a low range, a center range, and a high range, said step of adjusting said transfer rate comprising:

maintaining said transfer rate constant when said extent is in said center range, continuously decreasing said transfer rate when said extent is in said low range, continuously increasing said transfer rate when said extent is in said high range.

* * * * *